US009424657B2

(12) United States Patent
Huang et al.

(10) Patent No.: US 9,424,657 B2
(45) Date of Patent: Aug. 23, 2016

(54) IMAGE MOTION DETECTION METHOD, IMAGE PROCESSING METHOD AND APPARATUS USING THE METHODS

(71) Applicant: MStar Semiconductor, Inc., Hsinchu Hsien (TW)

(72) Inventors: Kuo-Chen Huang, Hsinchu County (TW); Chung-Yi Chen, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 189 days.

(21) Appl. No.: 14/186,525

(22) Filed: Feb. 21, 2014

(65) Prior Publication Data

US 2014/0254871 A1 Sep. 11, 2014

(30) Foreign Application Priority Data

Mar. 8, 2013 (TW) .............................. 102108355 A

(51) Int. Cl.
*G06K 9/00* (2006.01)
*G06T 7/20* (2006.01)
(52) U.S. Cl.
CPC ..................... *G06T 7/2013* (2013.01)
(58) Field of Classification Search
USPC ......................................................... 382/103
See application file for complete search history.

(56) References Cited

U.S. PATENT DOCUMENTS

| 6,456,661 | B1 | 9/2002 | Morel |
| 2008/0118163 | A1* | 5/2008 | Chang ................... H04N 5/144 382/236 |
| 2010/0067741 | A1* | 3/2010 | Stolkin ................ G06K 9/3241 382/103 |
| 2013/0058535 | A1 | 3/2013 | Othmezouri et al. |
| 2013/0129205 | A1* | 5/2013 | Wang ................... G06K 9/6278 382/164 |

FOREIGN PATENT DOCUMENTS

CN 102831616 12/2012

* cited by examiner

*Primary Examiner* — Yon Couso
(74) *Attorney, Agent, or Firm* — WPAT, PC; Justin King; Jonathan Chiang

(57) ABSTRACT

An image processing method for detecting an image motion information between a first image unit and a second image unit is provided. The first image unit and second image unit respectively comprise a plurality of blocks, and each of the blocks comprises a plurality of pixels. The image motion detection method comprises: analyzing pixels at the same position in all blocks of the first image unit to generate a first image statistical information; analyzing pixels at the same position in all blocks of the first image unit to generate a first image statistical information; and comparing the first image statistical information with the second image statistical information to determine the image motion information.

17 Claims, 17 Drawing Sheets

|     | CB    |     |     |     |     |
|-----|-------|-----|-----|-----|-----|
| $P_{11}$ | $P_{12}$ | $P_{13}$ | $P_{14}$ | $P_{15}$ | $P_{16}$ |
| $P_{21}$ | $P_{22}$ | $P_{23}$ | $P_{24}$ | $P_{25}$ | $P_{26}$ |
| $P_{31}$ | $P_{32}$ | $P_{33}$ | $P_{34}$ | $P_{35}$ | $P_{36}$ |
| $P_{41}$ | $P_{42}$ | $P_{43}$ | $P_{44}$ | $P_{45}$ | $P_{46}$ |
| $P_{51}$ | $P_{52}$ | $P_{53}$ | $P_{54}$ | $P_{55}$ | $P_{56}$ |

Img₁

Before compression

FIG. 2B (prior art)

|     | CB  |     |     |     |     |
|-----|-----|-----|-----|-----|-----|
| $P_{11}$ | $P_{12}$ | $P_{13}$ | $P_{14}$ | $P_{15}$ | $P_{16}$ |
| $P_{21}$ | $(P_{22}+P_{32})/2$ | $(P_{23}+P_{33})/2$ | $(P_{24}+P_{34})/2$ | $(P_{25}+P_{35})/2$ | $P_{26}$ |
| $P_{31}$ | $(P_{22}+P_{32})/2$ | $(P_{23}+P_{33})/2$ | $(P_{24}+P_{34})/2$ | $(P_{25}+P_{35})/2$ | $P_{36}$ |
| $P_{41}$ | $P_{42}$ | $P_{43}$ | $P_{44}$ | $P_{45}$ | $P_{46}$ |
| $P_{51}$ | $P_{52}$ | $P_{53}$ | $P_{54}$ | $P_{55}$ | $P_{56}$ |

Img₁

After decompression

FIG. 2C (prior art)

Before compression

After decompression

CB_N

| $P_{11}$ | $P_{12}$ | $P_{13}$ | $P_{14}$ | $P_{15}$ | $P_{16}$ |
|---|---|---|---|---|---|
| $P_{21}$ | $P_{22}$ | $P_{23}$ | $P_{24}$ | $P_{25}$ | $P_{26}$ |
| $P_{31}$ | $P_{32}$ | $P_{33}$ | $P_{34}$ | $P_{35}$ | $P_{36}$ |
| $P_{41}$ | $P_{42}$ | $P_{43}$ | $P_{44}$ | $P_{45}$ | $P_{46}$ |
| $P_{51}$ | $P_{52}$ | $P_{53}$ | $P_{54}$ | $P_{55}$ | $P_{56}$ |

$Img_1$

Before compression

| $P_{11}$ | $P_{12}$ | $P_{13}$ | $P_{14}$ | $P_{15}$ | $P_{16}$ |
|---|---|---|---|---|---|
| $P_{21}$ | $(P_{22}+P_{32})/2$ | $(P_{23}+P_{33})/2$ | $(P_{24}+P_{34})/2$ | $(P_{25}+P_{35})/2$ | $P_{26}$ |
| $P_{31}$ | $(P_{22}+P_{32})/2$ | $(P_{23}+P_{33})/2$ | $(P_{24}+P_{34})/2$ | $(P_{25}+P_{35})/2$ | $P_{36}$ |
| $P_{41}$ | $P_{42}$ | $P_{43}$ | $P_{44}$ | $P_{45}$ | $P_{46}$ |
| $P_{51}$ | $P_{52}$ | $P_{53}$ | $P_{54}$ | $P_{55}$ | $P_{56}$ |

$Img_2$

After decompression

FIG. 9B

IMAGE MOTION DETECTION METHOD, IMAGE PROCESSING METHOD AND APPARATUS USING THE METHODS

This application claims the benefit of Taiwan application Serial No. 102108355, filed Mar. 8, 2013, the subject matter of which is incorporated herein by reference.

BACKGROUND OF THE INVENTION

1. Field of the Invention

The invention relates in general to an image motion detection method and an image processing method, and an apparatus using the methods, and more particularly to an image motion detection method and an image processing method that determine an image motion by comparing pixel information at a same position in different blocks, and an apparatus using the methods.

2. Description of the Related Art

In an image processing apparatus, scaling is usually performed to reduce a transmission bandwidth and a storage space of image data. FIG. 1 shows a schematic diagram of a conventional image scaling operation. In FIG. 1, a second image $Img_2$ is a next image of a first image $Img_1$, and a third image $Img_3$ is a next image of the second image $Img_2$. Alphabetical denotations A, B, ... and H represent positions in the first image $Img_1$, the second image $Img_2$ and the third image $Img_3$, and pixels $P_1, \ldots$ and $P_{10}$ are corresponding pixels at the positions A, B, ... and H. For example, in the first image $Img_1$, the pixel at the position A is $P_1$, and the pixel at the position B is $P_2$; in the second image $Img_2$, the pixel at the position A is $P_2$, and the pixel at the position B is $P_3$. Again referring to the first image $Img_1$, in the first image $Img_1$, the pixels at the positions A to H are respectively $P_1$ to $P_8$. When a scaling down operation is performed, the first image $Img_1$ is processed by a scaling filter SF, which filters out the pixels at the positions B, D, F and H and leaves only the pixels $P_1, P_3, P_5$ and $P_7$ for further processing to generate pixels $P_1', P_3', P_5'$ and $P_7'$. It should be noted that the unfiltered pixels cannot be modified. That is, in the current situation, rather than the pixels $P_1', P_3', P_5'$ and $P_7'$, the pixels $P_1, P_3, P_5$ and $P_7$ are kept. In the following embodiments, descriptions are given based on processing the unfiltered pixels.

When a scaling up operation is performed on the downscaled first image $Img_1$, pixels (to be referred to as $P_{2I}, P_{4I}, P_{6I}$ and $P_{8I}$) are interpolated for pixels originally at the positions B, D, F and H according to the pixels $P_1', P_3', P_5'$ and $P_7'$. One method for generating the pixels $P_{2I}, P_{4I}, P_{6I}$ and $P_{8I}$ is to interpolate the pixel $P_{2I}$ using the pixels $P_1'$ and $P_3'$, the pixel $P_{4I}$ using the pixels $P_3'$ and $P_5'$, the pixel $P_{6I}$ using the pixels $P_5'$ and $P_7'$, and $P_{8I}$ using the pixels $P_7'$ and $P_9'$ (located at the right of the pixel $P_8'$). The pixels $P_1', P_3', P_5'$ and $P_7'$ become pixels $P_1'', P_3'', P_5''$ and $P_7''$ after the scaling up operation. Similarly, the pixels $P_1', P_3', P_5'$ and $P_7'$ are kept as the pixels $P_1', P_3', P_5'$ and $P_7'$ after the scaling up operation. In the following embodiments, examples of brightness of the unfiltered pixels being changed by the scaling up operation are illustrated in the descriptions.

In the second image $Img_2$, the pixels at the positions A to H are respectively $P_2$ to $P_9$. That is, compared to the first image $Img_1$, the image at the positions A to H in the second image $Img_2$ is shifted to the left. Therefore, when a scaling down operation is performed on the second image $Img_2$, the pixels at the positions B, D, F and H are similarly filtered out by the scaling filter SF to leave only the pixels $P_2', P_4', P_6'$ and $P_8'$. After scaling up the second image $Img_2$, pixels $P_{3I}, P_{5I}, P_{7I}$ and $P_{9I}$ are interpolated.

In the third image $Img_3$, the pixels at the positions A to H are respectively $P_3$ to $P_{10}$. That is, compared to the second image $Img_2$, an image at the positions A to H in the third image $Img_3$ is shifted to the left. Therefore, when a scaling down operation is performed on the third image $Img_3$, the pixels at the positions B, D, F and H are similarly filtered out by the scaling filter SF to leave only the pixels $P_3', P_5', P_7'$ and $P_8'$. After scaling up the third image $Img_3$, pixels $F_{4I}, P_{6I}, P_{8I}$ and $P_{10I}$ are interpolated.

It is seen from the foregoing descriptions that, in a situation of a moving image, the brightness of pixels that are scaled down and then scaled up constantly changes. For example, the brightness of the pixel $P_3$ is the brightness of the pixel $P_3''$ in the first image $Img_1$, becomes the brightness of the pixel $P_{3I}$ interpolated according to the pixels $P_2$ and $P_4$ in the second image $Img_2$, and restores to the brightness of the pixel $P_3''$ in the third image $Img_3$. As such, the brightness of the pixel $P_3$ constantly changes while other pixels also encounter the same problem, leading to a flickering issue in the image.

Similarly, in an image processing apparatus, to reduce the transmission bandwidth and storage space of image data, a compression operation may be performed on the image data. FIGS. 2A, 2B, 2C, 3A and 3B show schematic diagrams of an image compression/decompression operation in the prior art. As shown in FIG. 2B, the first image $Img_1$ includes pixels $P_{11}$ to $P_{56}$. During compression, the pixels $P_{22}$ to $P_{25}$ and $P_{32}$ to $P_{35}$ (represented by a non-compression band NCB in FIG. 2A) are compressed according to a compression band CB to form the compression band CB in FIG. 2A. The compression band CB is a half (only 4 pixels) of the size of the non-compression band NCB, and a value of a pixel in the compression band CB is an average of the corresponding pixels in the non-compression band NCB. For example, the brightness of the pixel in the compression band CB compressed based on the pixels $P_{22}$ and $P_{32}$ is the average of the pixels $P_{22}$ and $P_{32}$ (i.e., $(P_{22}+P_{32})/2$), the brightness of the pixel in the compression band CB compressed based on the pixels $P_{23}$ and $P_{33}$ is the average of the pixels $P_{23}$ and $P_{33}$ (i.e., $(P_{23}+P_{33})/2$), and so forth. After decompressing the compression band CB, the original brightness of the pixels is replaced by the brightness in the compression band CB to generate the decompression band DCB in FIG. 2A. For example, the brightness of the pixels $P_{22}$ and $P_{32}$ is replaced by $(P_{22}+P_{32})/2$, and the brightness of the pixels $P_{23}$ and $P_{33}$ is replaced by $(P_{23}+P_{33})/2$.

The second image $Img_2$ in FIGS. 3A and 3B is a next image of the first image Img1 in FIGS. 2B and 2C. Compared to the first image $Img_1$, the image comprising the pixels $P_{11}$ to $P_{56}$ in the second image $Img_2$ is shifted upwards (a part indicated as OP in FIG. 3A). However, the position of the compression band CB remains the same as in FIGS. 2B and 2C, and so, instead of the pixels $P_{22}$ to $P_{25}$ and $P_{32}$ to $P_{35}$, the pixels $P_{32}$ to $P_{35}$ and $P_{42}$ to $P_{45}$ are compressed. After performing the compression and decompression procedure in FIG. 2A, the brightness of the pixels $P_{32}$ to $P_{35}$ and $P_{42}$ to $P_{45}$ in the second image $Img_2$ is replaced by $(P_{32}+P_{42})/2$, $(P_{33}+P_{43})/2$, $(P_{34}+P_{44})/2$ and $(P_{35}+P_{45})/2$. Thus, the brightness of the pixels $P_{22}$ to $P_{25}$, $P_{32}$ to $P_{35}$ and $P_{42}$ to $P_{45}$ is the original brightness of the pixels $P_{22}$ to $P_{25}$, $P_{32}$ to $P_{35}$ and $P_{42}$ to $P_{45}$ in the first image Img1 and second image $Img_2$ before compression, and however becomes different after the decompression. More specifically, the original brightness of the pixels $P_{22}$ to $P_{25}$, $P_{32}$ to $P_{35}$ and $P_{42}$ to $P_{45}$ after compressing/decompressing the first image $Img_1$ and the second image $Img_2$ is replaced by different brightness, leading to differences between the first image $Img_1$ and the second image $img_2$. As such, image flickering is likely resulted.

Therefore, the motion in the image needs to be detected in order to implement image processing steps such as scaling up/down and decompression. In a conventional motion detection method, the image motion is usually detected through sum of absolute differences (SAD). However, in such method, as differences between all pixels within a range of an image and all pixels within another range of another image need to be calculated, a tremendous amount of computation is involved.

SUMMARY OF THE INVENTION

It is an object of the present invention to provide an image motion detection method and apparatus capable of detecting image motion information by involving a smaller computation amount.

It is another object of the present invention to provide an image processing method and apparatus capable of detecting image motion information by involving a smaller computation amount and accordingly performing image processing.

According to an embodiment of the present invention, an image processing method for detecting an image motion information between a first image unit and a second image unit is provided. The first image unit and second image unit respectively comprise a plurality of blocks, and each of the blocks comprises a plurality of pixels. The image motion detection method comprises: analyzing pixels at the same position in all blocks of the first image unit to generate a first image statistical information; analyzing pixels at the same position in all blocks of the first image unit to generate a first image statistical information; and comparing the first image statistical information with the second image statistical information to determine the image motion information.

According to other embodiments of the present invention, an image processing apparatus for detecting image motion information between a first image unit and a second image unit is provided. The first image unit and second image unit respectively comprising a plurality of blocks and each of the blocks comprising a plurality of pixels. The image processing apparatus comprises an image motion detection module for determining the image motion information. And the image motion detection module comprises: a calculation unit for analyzing pixels at the same position in all blocks of the first image unit to generate a first image statistical information and analyzing pixels at the same position in all blocks of the second image unit to generate a second image statistical information and a comparison unit, for comparing the first image statistical information with the second image statistical information to determine the image motion information.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIGS. 2A, 2B, 2C, 3A and 3B are schematic diagrams of image compression/decompression operations in the prior art.

FIGS. 9A and 9B are schematic diagrams of compressing an image according to image motion information.

DETAILED DESCRIPTION OF THE INVENTION

Figure 4:
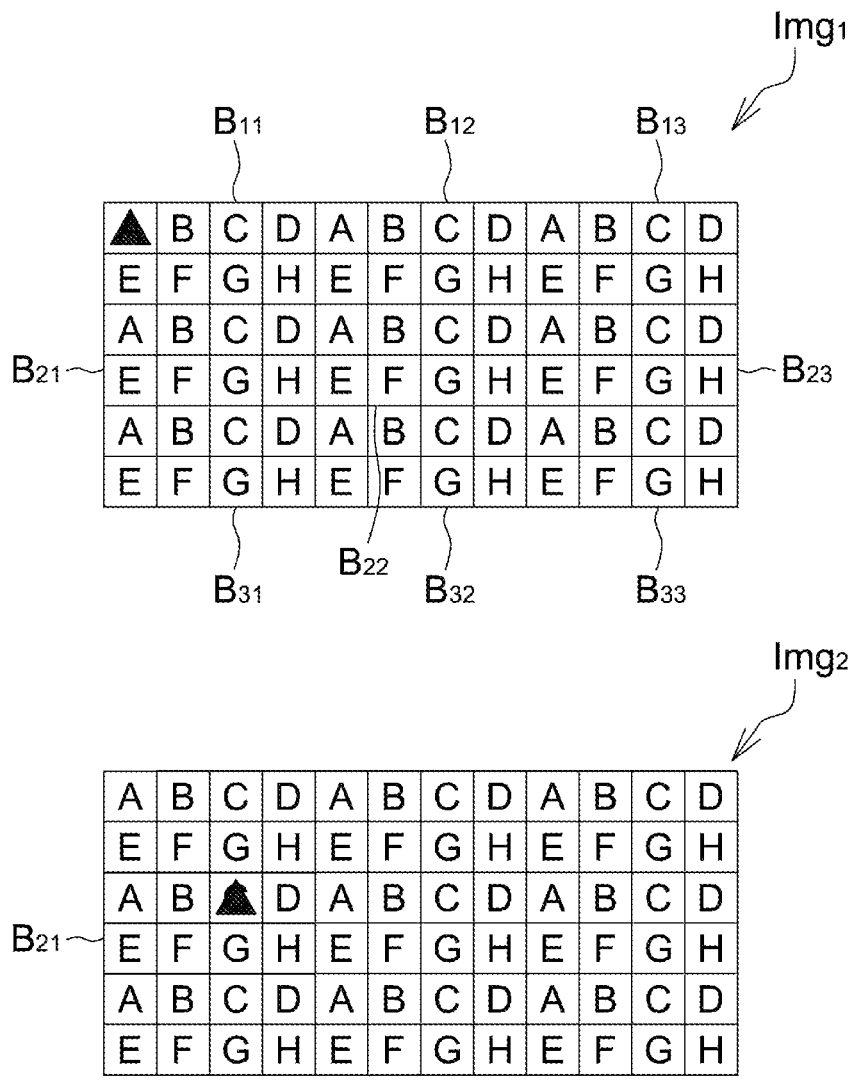
FIG. 4 is a schematic diagram of positions of pixels in blocks of images.

FIG. 4 shows a schematic diagram of pixel positions in blocks of images. Referring to FIG. 4, a second image $Img_2$ is a next image of a first image Img1. Both of the first image $Img_1$ and the second image $Img_2$ comprise a plurality of blocks (i.e., a plurality of image units), respectively, with 9 blocks shown in FIG. 4. Each of the blocks comprises 8 pixels respectively located at positions A to H. It is also assumed that the pixel (marked by a triangle) at the position A in the block B11 of the first image $Img_1$ moves to the position C in the block of the second image $Img_2$. In an image motion detection method according to an embodiment of the present invention, a plurality of sets of brightness distribution information of the pixels at the same position in each of the blocks of the first image Img1 are counted. For example, the brightness of each of the pixels at the position A in each of the blocks of the first image Img1 is counted to generate brightness distribution information corresponding to the position A, and the brightness of each of the pixels at the position B in each of the blocks of the first image Img1 is counted to generate brightness distribution information corresponding to the position B—the same step is performed for each of the positions in the blocks to generate first image statistical information. Similarly, a plurality of sets of brightness distribution information of the pixels at the same position in each of the blocks in the second image $Img_2$ are counted to generate second image statistical information. It should be noted that, the statistical information of either all or a part of the blocks of the first image $Img_1$ and the second image $Img_2$ may be counted.

Figure 5:
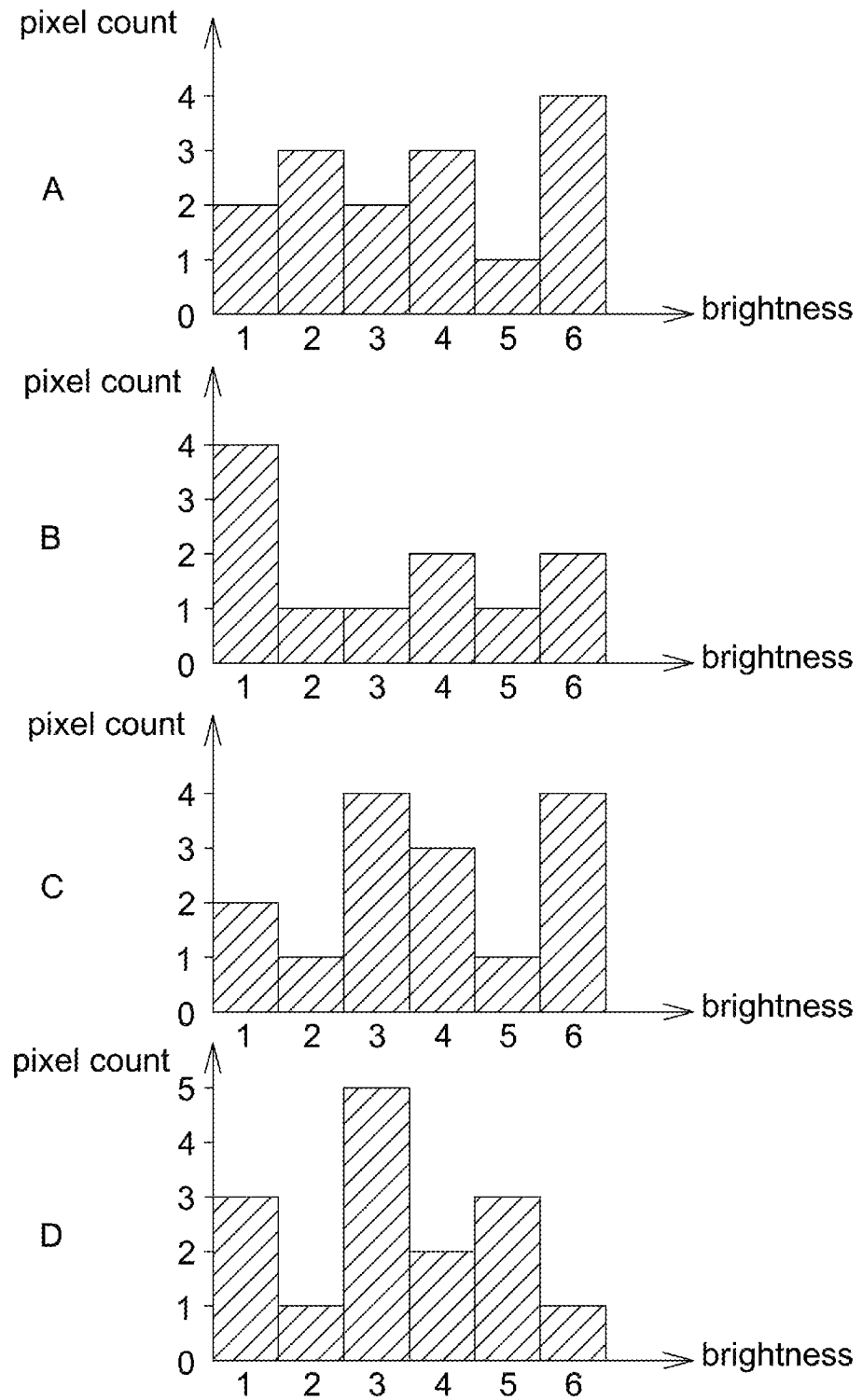
FIG. 5 is a schematic diagram of first image statistical information generated by an image motion detection method according to an embodiment of the present invention.
Figure 6:
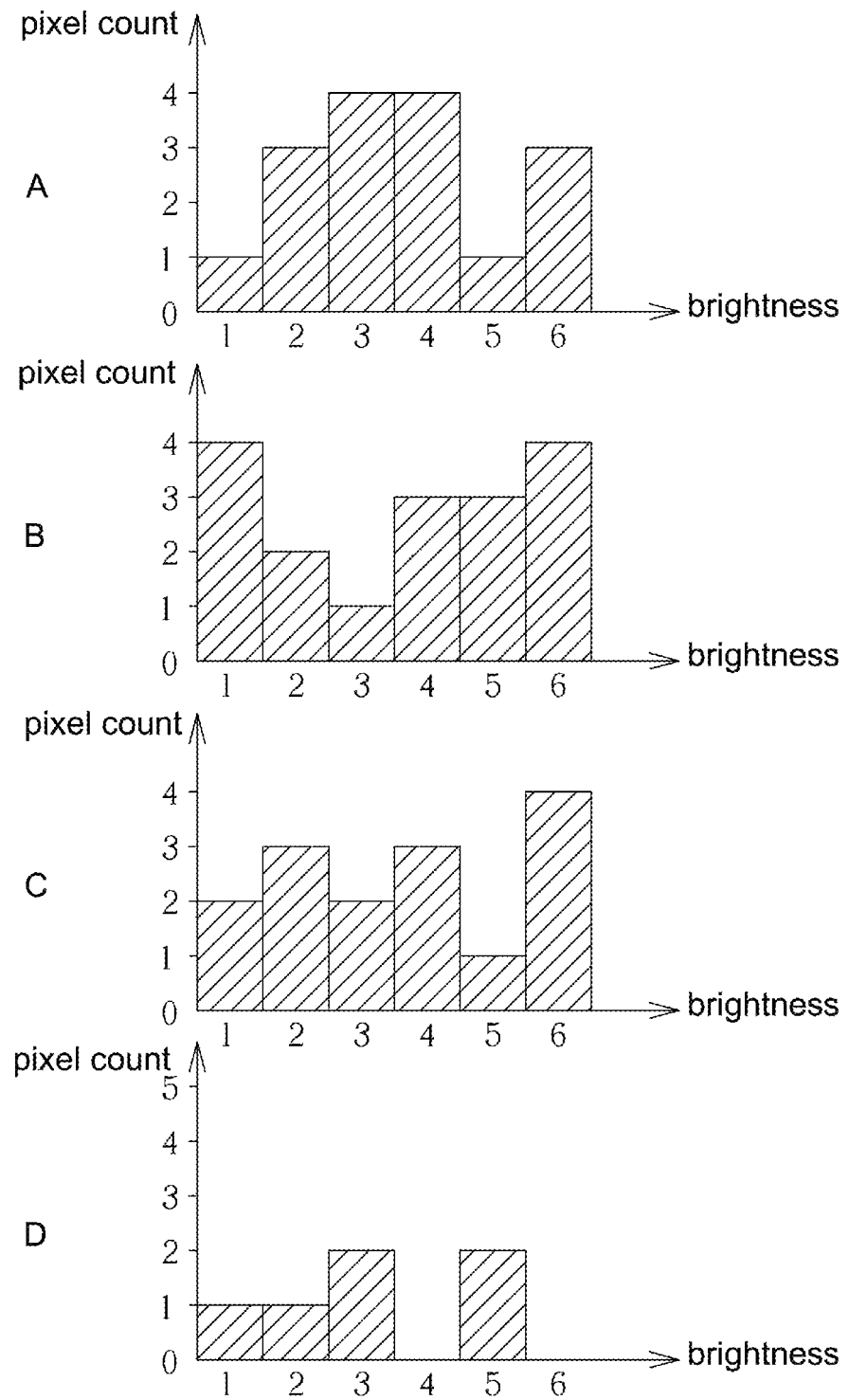
FIG. 6 is a schematic diagram of second image statistical information generated by an image motion detection method according to an embodiment of the present invention.

FIG. 5 shows a schematic diagram of first image statistical information generated by an image motion detection method according to an embodiment of the present invention. FIG. 6 shows a schematic diagram of second image statistical information generated by an image motion detection method according to an embodiment of the present invention. As previously described, the pixels at the same position in the blocks render one set of brightness distribution information. In the example, only brightness distribution information of pixels at the positions A to D is depicted. The brightness distribution information comprises pixel counts corresponding to different brightness levels. Taking FIG. 5 for example, among the pixels at the position A in the first image $Img_1$, the pixel count having a brightness level 1 is 2, the pixel count having a brightness level 2 is 3, and so forth. Similarly, among the pixels at the position B, the pixel count having a brightness level 1 is 4, the pixel count having a brightness level 2 is 1, and so forth. The brightness distribution information of the pixels at the positions C and D in the first image $Img_1$ and the brightness distribution information of the pixels at all the positions in the second image Img2 can be interpreted similarly, and shall be omitted herein. It should be noted that, in FIGS. 5 and 6, the first image statistical information and the second image statistical information are represented in form of histograms. In an alternative embodiment, the first image statistical information and the second image statistical information can also be represented by other kinds of graphs or numerical forms.

A same pixel is expected to have the same brightness distribution regardless of the position of the pixel. Thus, by comparing the first image statistical information and the second image statistical information, image motion information can be obtained. For example, comparing the first image statistical information in FIG. 5 and the second image statistical information in FIG. 6, it is discovered that the brightness distribution at the positions A in the first image $Img_1$ is the same as the brightness distribution at the positions C in the second image $Img_2$. Hence, it is concluded that the pixels at the position A in the first image $Img_1$ are moved to the position C in the second image $Img_2$. It should be noted that, in addition to the foregoing comparison approach, the comparison of the first image statistical information and the second image statistical information may be based on patterns or numerical values generated from the first image statistical information and the second image statistical information. Further, the foregoing brightness distribution information may also be replaced by color distribution information, and the graphs in FIGS. 5 and 6 correspondingly represent the pixel counts corresponding to different colors.

Figure 7:
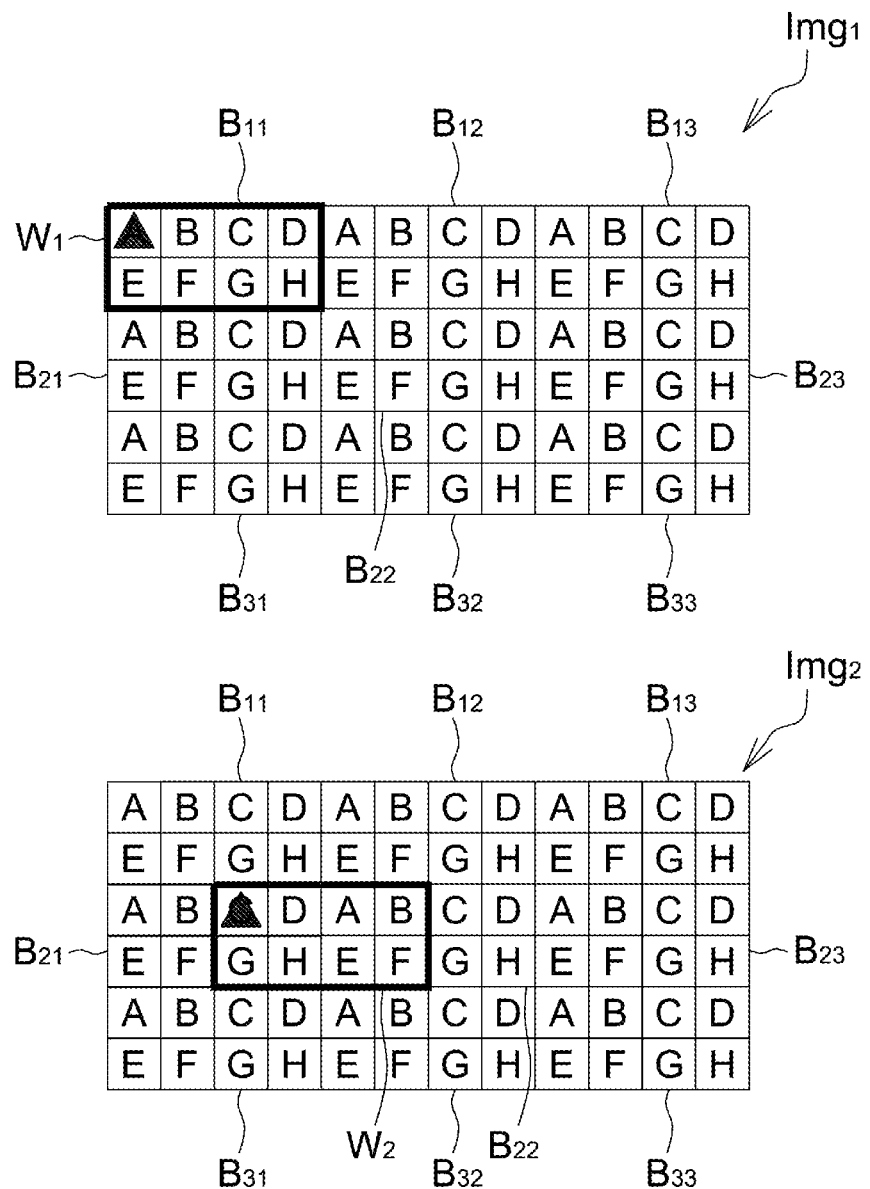
FIG. 7 is a schematic diagram of processing an image according to image motion information detected.

FIG. 7 shows a schematic diagram of processing an image according to image motion information detected. As shown in FIG. 7, it is detected that, among the pixels at the positions A to H in the block $B_{11}$ of the first image $Img_1$ processed by a processing band $W_1$, the pixel at the position A in the block $B_{11}$ of the first image $Img_1$ is moved to the position C in the block $B_{2I}$ of the second image $Img_2$. It is then inferred that the pixels at the positions A to H in the block $B_{11}$ of the first image $Img_1$ are moved to the positions C, D, G and H in the block $B_{2I}$ and the positions A, B, E and F in the block $B_{22}$ of the second image $Img_2$. Therefore, in the second image $Img_2$, rather than processing the pixels at the positions A to H in the block $B_{11}$ of the first image $Img_1$ by the processing band $W_1$, the pixels at the positions C, D, G and H in the block $B_{2I}$ and the pixels at the positions A, B, E and F in the block $B_{22}$ of the second image $Img_2$ are processed by a processing band $W_2$.

Figure 1:
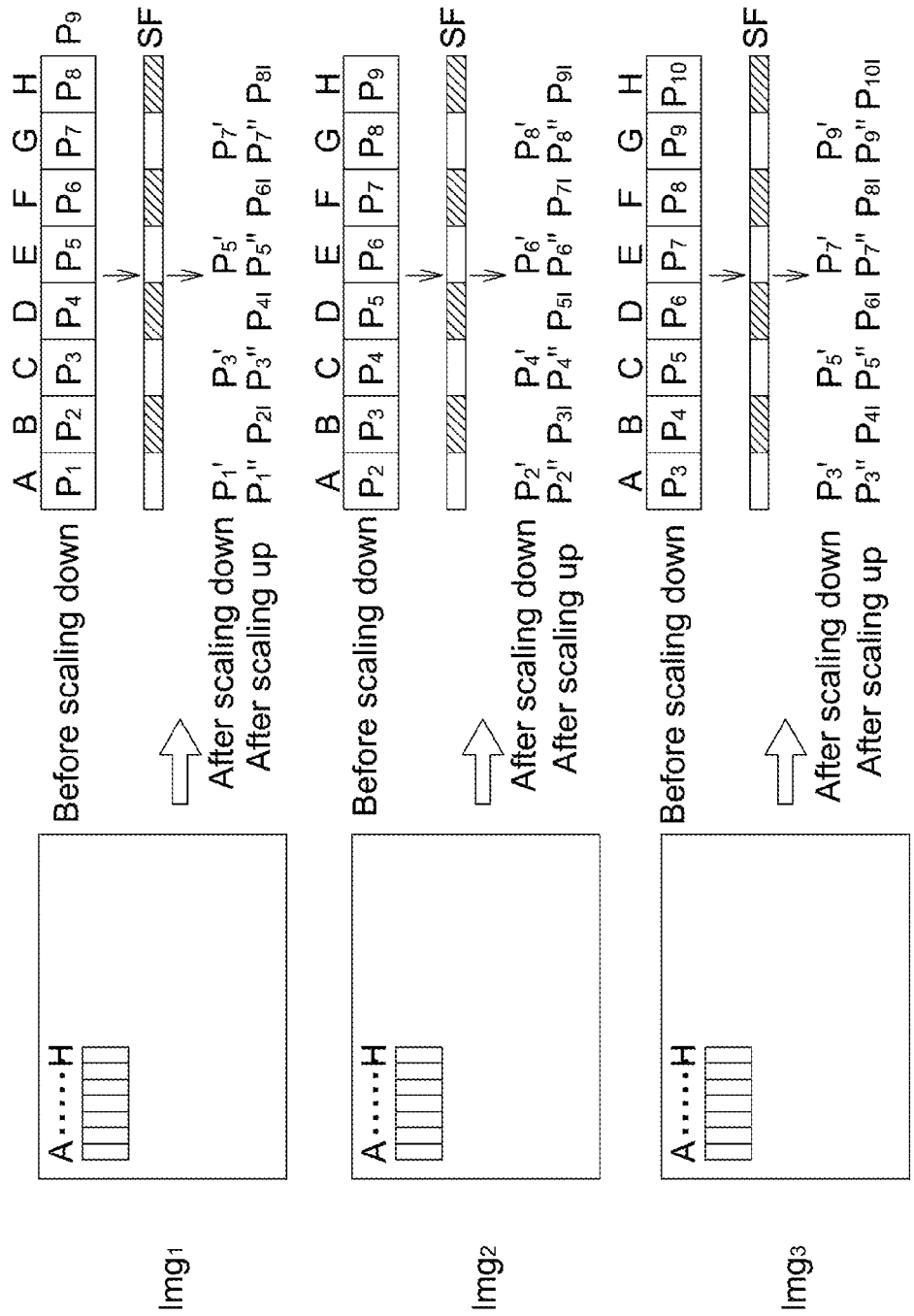
FIG. 1 is a schematic diagram of an image scaling operation in the prior art.
Figure 8:
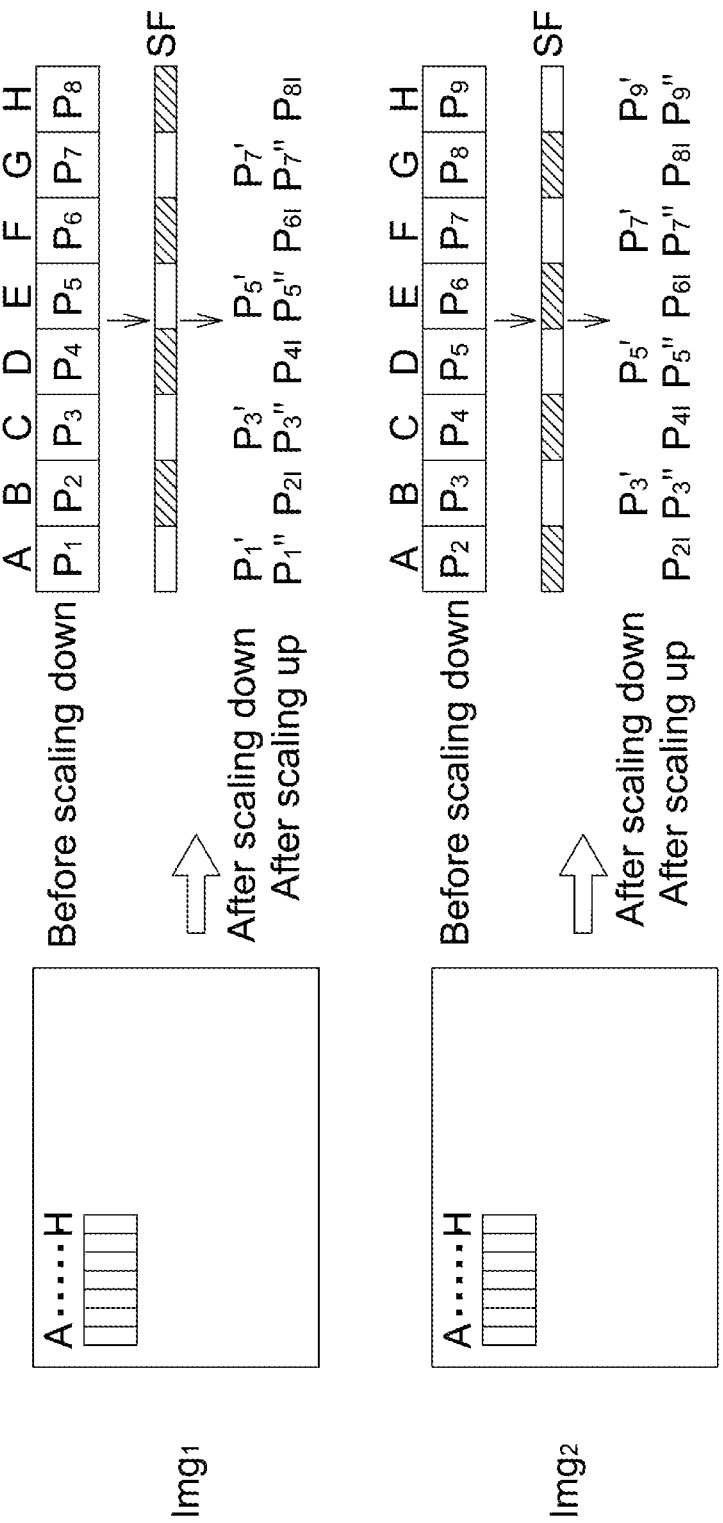
FIG. 8 is a schematic diagram of down-scaling an image according to image motion information.

FIG. 8 shows a schematic diagram of down-scaling an image according to image motion information. In FIG. 8, a second image $Img_2$ is a next image of a first image $Img_1$. Operations for scaling down the first image $Img_1$ are the same as those for the first image $Img_1$ in FIG. 1. However, when scaling down the second image $Img_2$, a filter order status of the scaling filter SF is changed (i.e., a parameter of the filter is modified). As such, after scaling down the second image $Img_2$, the kept pixels are $P_3'$, $P_5'$, $P_7'$ and $P_9'$ instead of the pixels $P_2'$, $P_4'$, $P_6'$ and $P_8'$ after scaling the second image $Img_2$ in FIG. 1 (prior art). Therefore, after scaling up the second image $Img_2$ in FIG. 8, the interpolated pixels are $P_2I$, $P_4I$, $P_6I$ and $P_8I$, and so the brightness of the pixels is maintained stable. For example, the value of the pixel $P_3$ is kept persistently as the value of the pixel $P_3''$ (i.e., the value of the pixel $P_3'$ when the brightness of the pixel is not changed when the image is scaled up) rather than constantly changing as the contents shown in FIG. 1. The purpose of modifying the parameter of the filter is to change the sampling point when re-sampling a signal, and so the operation of modifying the parameter of the filter may also be regarded as changing a scaling phase.

Figure 2A:
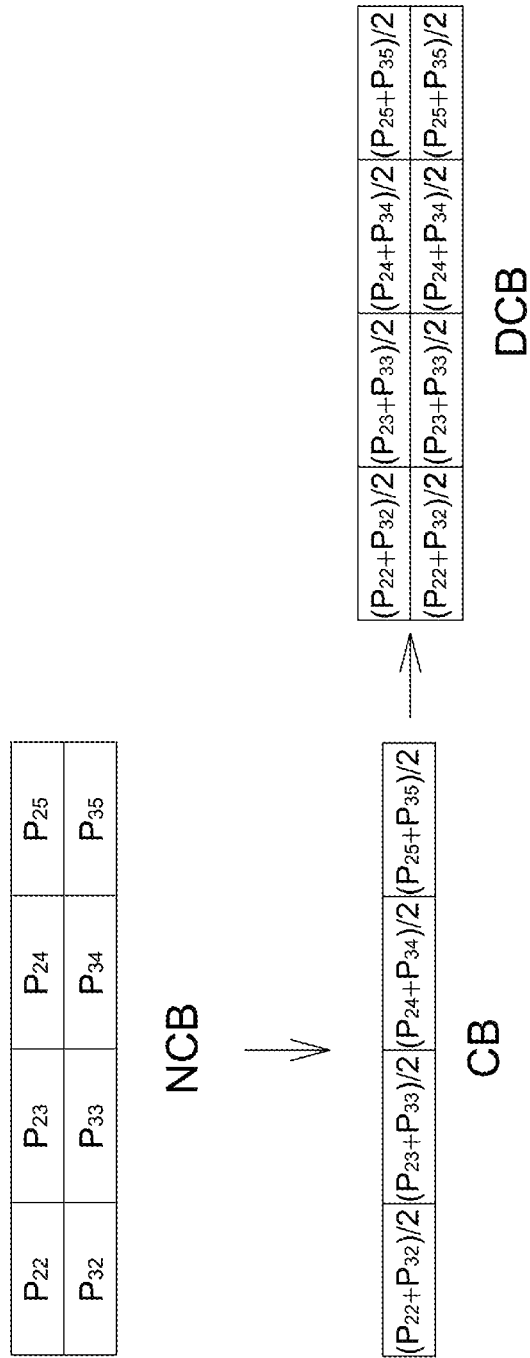
Figure 3A:
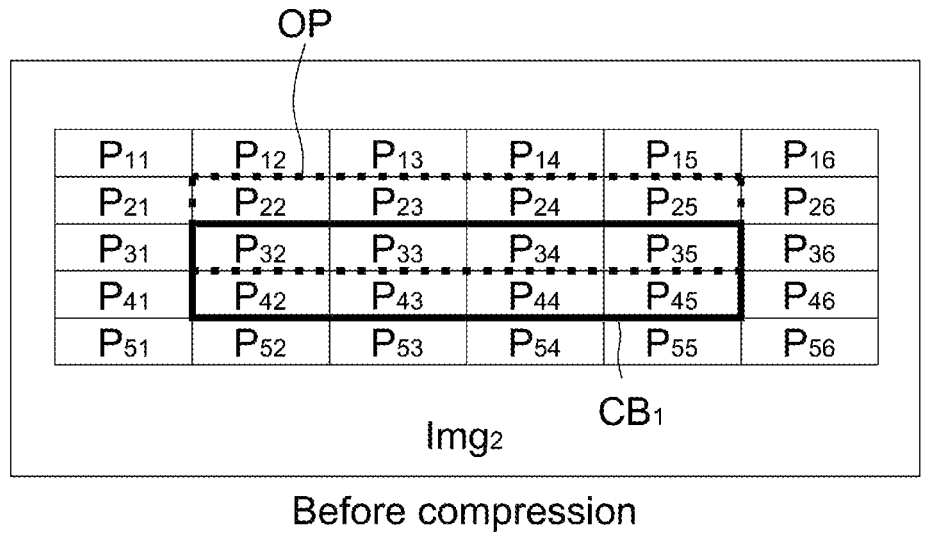
Figure 3B:
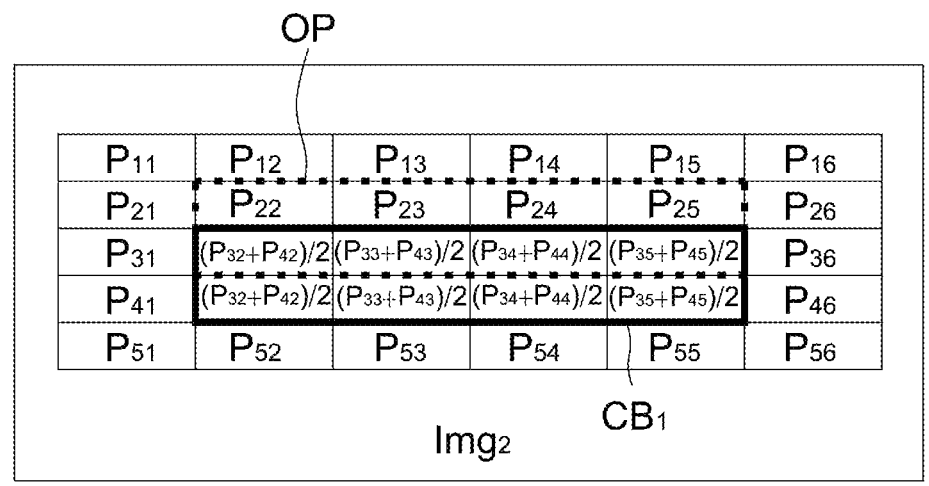

FIGS. 9A and 9B show schematic diagrams of compressing an image according to image motion information. Referring to FIGS. 3A, 3B, 9A and 9B, a second image $Img_2$ in FIG. 9A is the same as that shown in FIG. 3A, and an image comprising pixels $P_{11}$ to $P_{56}$ is shifted upwards compared to the first image $Img_1$ in FIG. 2B. Through the foregoing image motion detection method, the image motion information is obtained. Thus, in FIG. 9A, the pixels $P_{22}$ to $P_{25}$ and $P_{32}$ to $P_{35}$ are compressed by a new compression band $CB_N$ to generate compressed pixels that are consistent with the compressed pixels in FIG. 2B. The compression band may be modified through many other methods. For example, the same effect can be achieved by directly modifying range of the pixels for compression or through compressing the required pixels by moving the image. After decompression, the same decompression result as shown in FIG. 2C can be obtained after performing decompression, as shown in FIG. 9C. That is, the brightness of the pixels $P_{22}$ to $P_{25}$ and $P_{32}$ to $P_{35}$ is replaced by $(P_{22}+P_{32})/2$, $(P_{23}+P_{33})/2$, $(P_{24}+P_{34})/2$ and $(P_{25}+P_{35})/2$. As such, the flickering issue aroused by image compression and decompression of a moving image due to a fixed location of the compression as the contents shown in FIGS. 3A and 3B can be eliminated.

Figure 10:
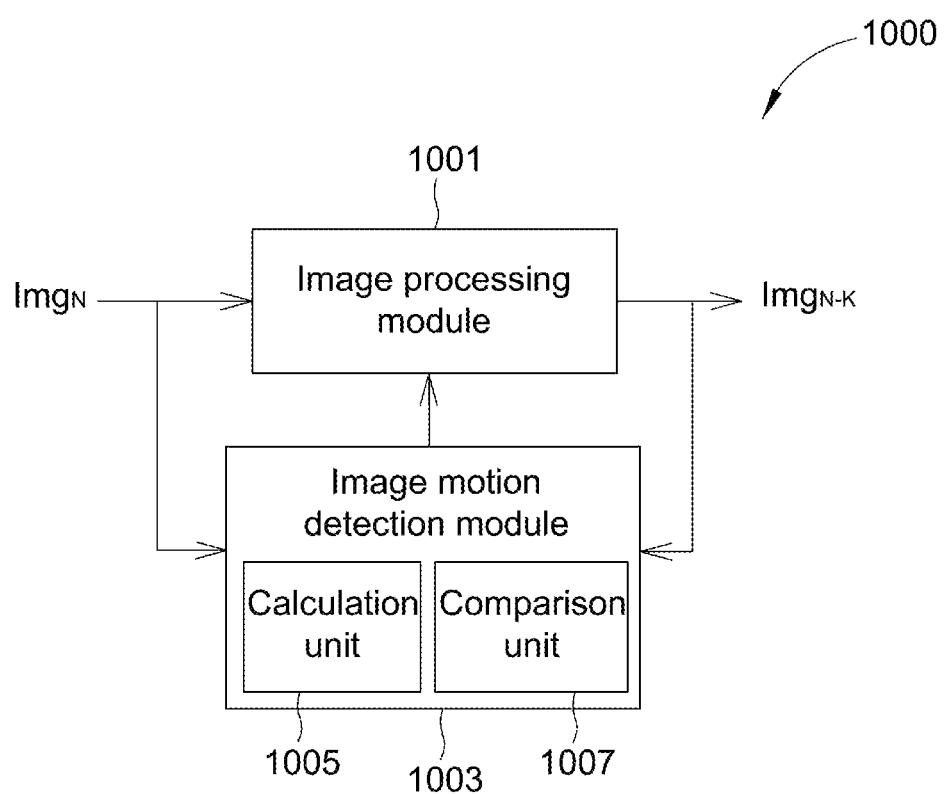
FIG. 10 is a block diagram of an image processing apparatus according to an embodiment of the present invention.

FIG. 10 shows an image processing apparatus 1000 according to an embodiment of the present invention. As shown in FIG. 10, the image processing apparatus 1000 comprises an image processing module 1001 and an image motion detection module 1003. A prior image $Img_{N-K}$ is $K^{th}$ image prior to a subsequent image $Img_N$, and is an image processed by the image processing module 1001. K is a positive integer greater than or equal to 1, and may be determined according to a frame rate or a processing speed of internal components of the image processing module 1001. The image motion detection module 1003 comprises a calculation unit 1005 and a comparison unit 1007. The calculation unit 1005 counts prior image statistical information of the prior image $Img_{N-K}$ and subsequent image statistical information of the subsequent image $Img_N$ as described with reference to FIGS. 5 and 6. The comparison unit 1007 compares the prior image statistical information and the subsequent image statistical information to calculate image motion information IM, and sends the image motion information IM to the image processing module 1001. The image processing module 1001 processes the subsequent image according to the image motion information IM. For example, the image processing module 1001 may modify the processing pixel range as shown in FIG. 7 to process at least one pixel. It should be noted that, the image motion detection module 1003 may calculate the pixel information based on an entire prior image $Img_{N-K}$ received, or may directly receive the pixel information calculated by and sent from the image processing module 1001.

Figure 11:
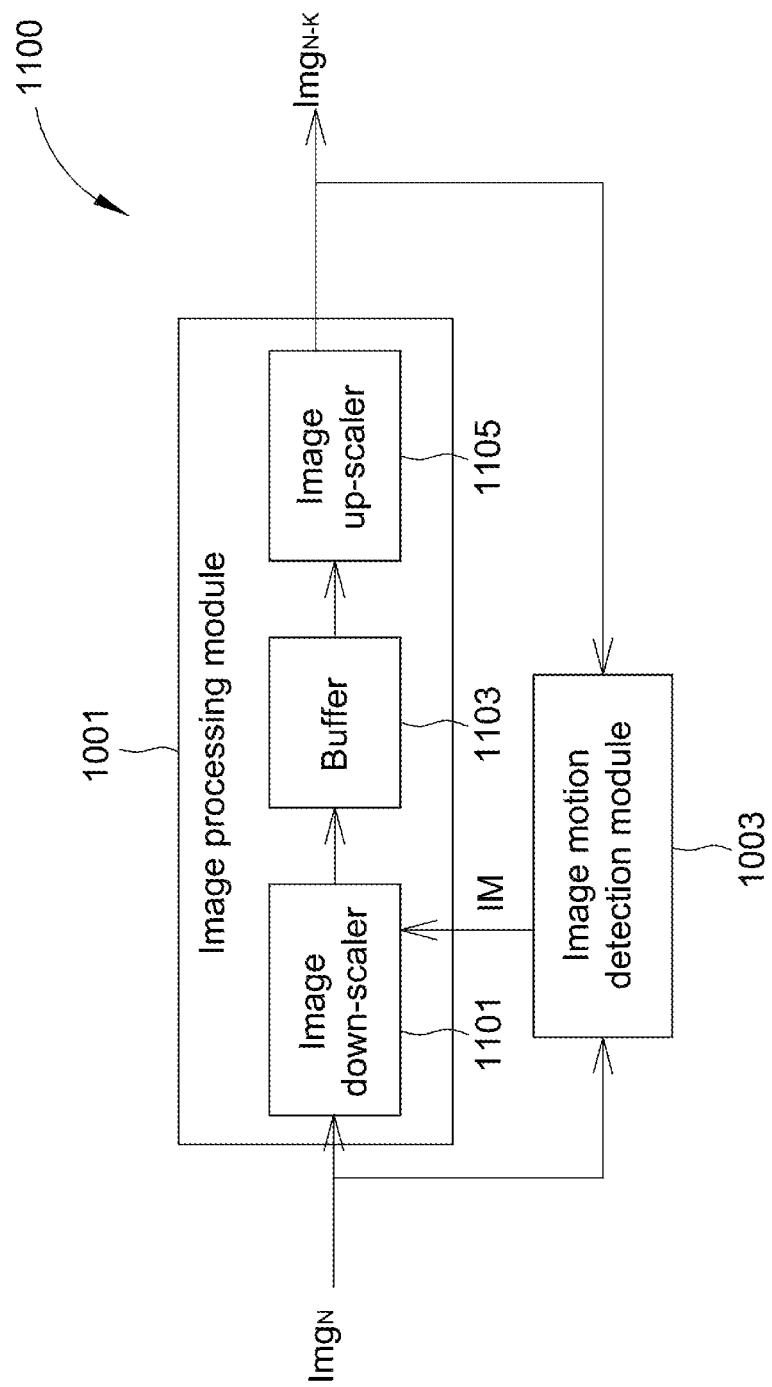
FIG. 11 is a block diagram of an image scaling apparatus according to an embodiment of the present invention.

The image processing apparatus 1000 in FIG. 10 may be an image scaling apparatus or an image compression/decompression unit. FIG. 11 shows a block diagram of an image scaling apparatus according to an embodiment of the present invention. In the embodiment in FIG. 11, the image processing module 1001 comprises an image down-scaler 1001 (i.e., the foregoing down-scaling filter SF), a buffer 1103 and an image up-scaler 1105. It should be noted that, the image down-scaler 1101 and the image up-scaler 1105 may be integrated into a same image scaler, and the buffer 1103 as an optional element may be omitted. As shown in FIG. 11, the prior image $Img_{N-K}$ scaled down and then scaled up or the corresponding pixel information is sent to the image motion detection module 1003, and the subsequent image $Img_N$ or the corresponding pixel information is also sent to the image motion detection module 1003. As described with reference to FIGS. 5 and 6, the image motion detection module 1003 counts the prior image statistical information of the prior image $Img_{N-K}$ and the subsequent image statistical information of the subsequent image $Img_N$, compares the prior image statistical information and the subsequent image statistical information to calculate the image motion information IM, and sends the image motion information IM to the image down-scaler 1101 (or an image scaler supporting an image down-scaling function). As shown in FIG. 8, the image motion detection module 1003 further adjusts a scaling phase of the image down-scaler 1101 or adjusts a filter parameter.

Figure 12:
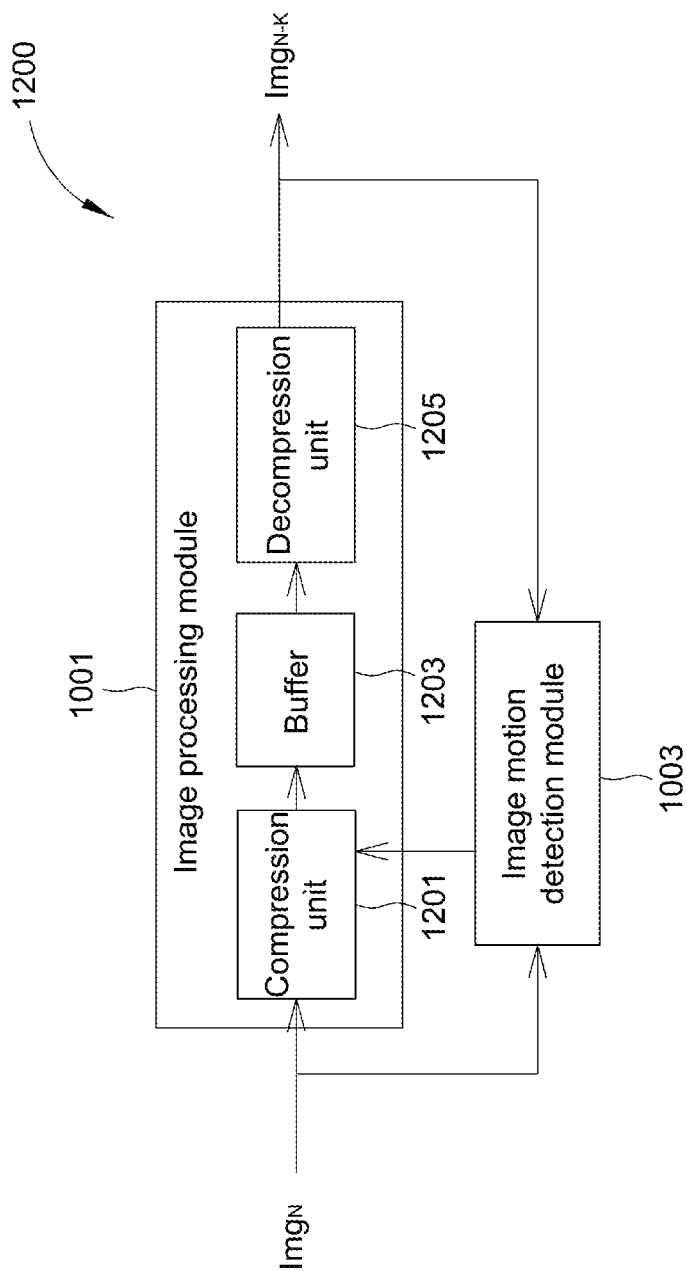
FIG. 12 is a block diagram of an image compression/decompression unit according to an embodiment of the present invention.

FIG. 12 shows a block diagram of an image compression/decompression unit according to an embodiment of the present invention. In the embodiment in FIG. 12, the image processing module 1001 comprises a compression unit 1201, a buffer 1203 and a decompression unit 1205. It should be noted that, the buffer 1203 as an optional element may also be omitted. As shown in FIG. 12, the prior image $Img_{N-K}$ scaled down and then scaled up or the corresponding pixel information is sent to the image motion detection module 1003, and the subsequent image $Img_N$ or the corresponding pixel information is also sent to the image motion detection module 1003. As described with reference to FIGS. 5 and 6, the image motion detection module 1003 counts the prior image statistical information of the prior image $Img_{N-K}$ and the subsequent image statistical information of the subsequent image $Img_N$, compares the prior image statistical information and the subsequent image statistical information to calculate the image motion information IM, and sends the image motion information IM to the compression unit 1201. As shown in FIG. 9A, the image motion detection module 1003 further adjusts a compression pixel range of the compression unit 1201.

Figure 13:
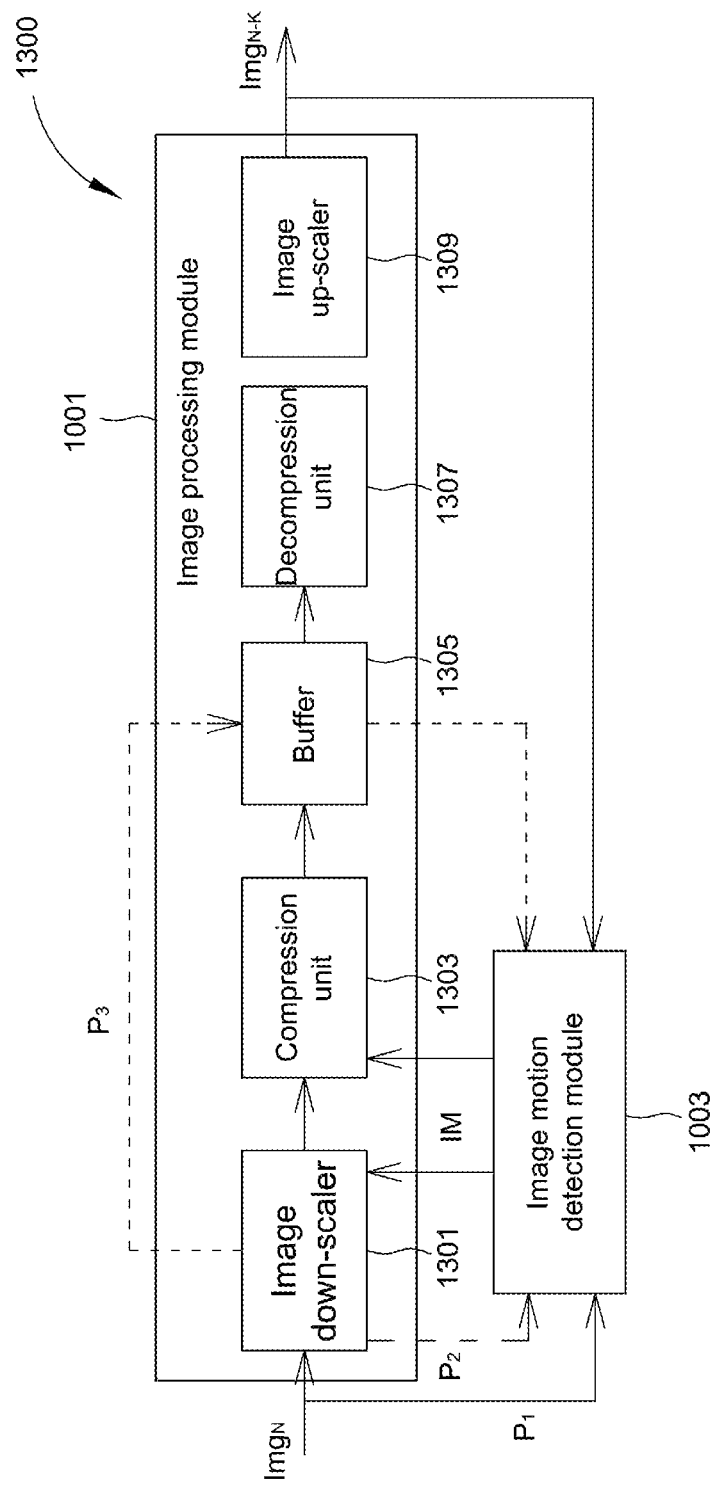
FIG. 13 is a block diagram of an image processing apparatus according to another embodiment of the present invention.

FIG. 13 shows a block diagram of an image processing apparatus according to another embodiment of the present invention. As shown in FIG. 13, the image processing module 1001 comprises an image down-scaler 1301, a compression unit 1303, a buffer 1305, a decompression unit 1307 and an image up-scaler 1309. Accordingly, an image output from the image processing module 1001 undergoes a down-scaling, compression, decompression and up-scaling procedure. In the embodiment, the image motion detection module 1003 may output the image motion information IM to at least one of the image down-scaler 1301 and the decompression unit 1303 to allow the image down-scaler 1301 and/or the decompression unit 1303 to process the image according to the image motion information IM. The image motion detection module 1003 may also obtain the image information of the subsequent image $Img_N$ from several paths. For example, the subsequent image $Img_N$ or the corresponding pixel information may be input to the image motion detection module 1003 directly via a path $P_1$, or may obtain the pixel information or the subsequent image $Img_N$ from the image down-scaler 1301 via a path $P_2$. Alternatively, the image information of the subsequent image $Img_N$ may be buffered in the buffer 1305 and be sent to the image motion detection module via a path $P_3$.

Figure 14:
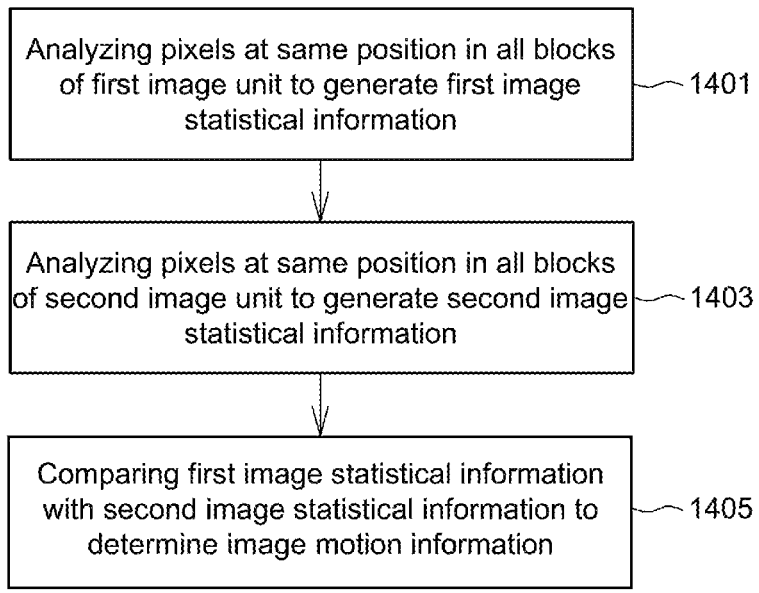
FIG. 14 is a flowchart of an image motion detection method according to an embodiment of the present invention.

FIG. 14 shows a flowchart of an image motion detection method according to an embodiment of the present invention. The image motion detection method comprises the following steps.

In step 1401, analyze pixels at the same position in all blocks of a first image unit to generate a first image statistical information, wherein the first image unit consists of multiple blocks and each block comprises consists of multiple pixels. As in the embodiment in FIG. 4, in the first image $Img_1$, the pixel information of all of the pixels at the position A is counted, the pixel information of all of the pixels at the position B is counted, and so forth, to accordingly generate the first image statistical information based on the pixel information of the pixels at all of the positions.

In step 1403, analyze pixels at the same position in all blocks of a second image unit to generate a second image statistical information, wherein the second image unit consists of multiple blocks and each block comprises consists of multiple pixels. And the block sizes in the first image and the second image are the same. As in the embodiment in FIG. 4, in the second image $Img_2$, the pixel information of all of the pixels at the position A is counted, the pixel information of all of the pixels at the position B is counted, and so forth, to accordingly generate the second image statistical information based on the pixel information of the pixels at all of the positions.

In step 1405, compare the first image statistical information with the second image statistical information to determine image motion information.

Figure 15:
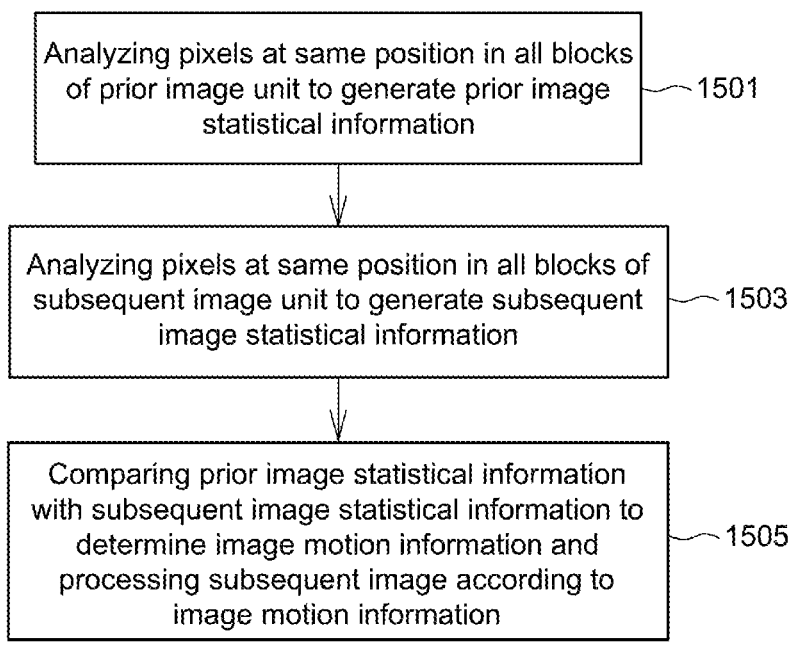
FIG. 15 is a flowchart of an image processing method according to an embodiment of the present invention.

FIG. 15 shows a flowchart of an image processing method according to an embodiment of the present invention. The image processing method comprises the following steps.

In step 1501, analyze pixels at the same position in all blocks of a prior image unit to generate a prior image statistical information, wherein the prior image unit consists of multiple blocks and each block comprises consists of multiple pixels. As the first image $Img_1$ is a prior image relative to the second image $Img_2$, the first image statistical information generated may be regarded as the prior image statistical information.

In step 1503, analyze pixels at the same position in all blocks of a subsequent image unit to generate a subsequent image statistical information, wherein the subsequent image unit consists of multiple blocks and each block comprises consists of multiple pixels. And the block sizes in the prior image and the subsequent image are the same. As in the embodiment in FIG. 4, in the second image $Img_2$, the pixel information of all of the pixels at the position A is counted, the pixel information of all of the pixels at the position B is counted, and so forth, to accordingly generate the subsequent image statistical information based on the pixel information of the pixels at all of the positions. As the second image $Img_2$ is a subsequent image relative to the first image $Img_1$, the second image statistical information generated may be regarded as the subsequent image statistical information.

In step 1505, compare the prior image statistical information with the subsequent image statistical information to determine image motion information and process the subsequent image according to the image motion information, as described in the embodiment in FIG. 7.

Figure 16:
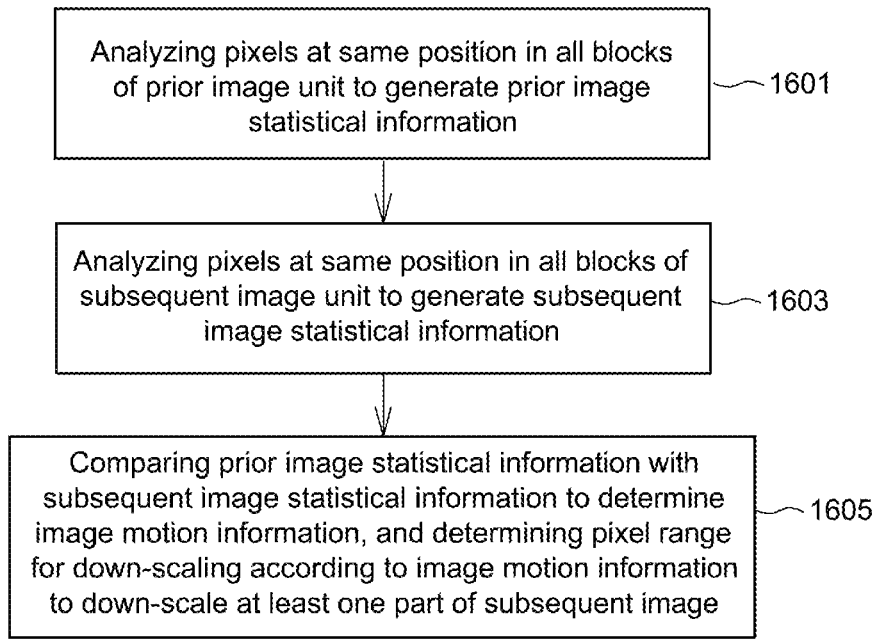
FIG. 16 is a flowchart of an image scaling method according to an embodiment of the present invention.

FIG. 16 shows a flowchart of an image scaling method according to an embodiment of the present invention. The image scaling method comprises the following steps.

In step 1601, analyze pixels at the same position in all blocks of a prior image unit to generate a prior image statistical information, wherein the prior image unit consists of multiple blocks and each block comprises consists of multiple pixels.

In step 1603, analyze pixels at the same position in all blocks of a subsequent image unit to generate a subsequent image statistical information, wherein the subsequent image unit consists of multiple blocks and each block comprises consists of multiple pixels. And the block sizes in the prior image and the subsequent image are the same.

In step 1605, compare the prior image statistical information with the subsequent image statistical information to determine image motion information and determine a pixel range for down-scaling according to the image motion information to down-scale at least one part of the subsequent image, as in the embodiment in FIG. 8.

Figure 17:
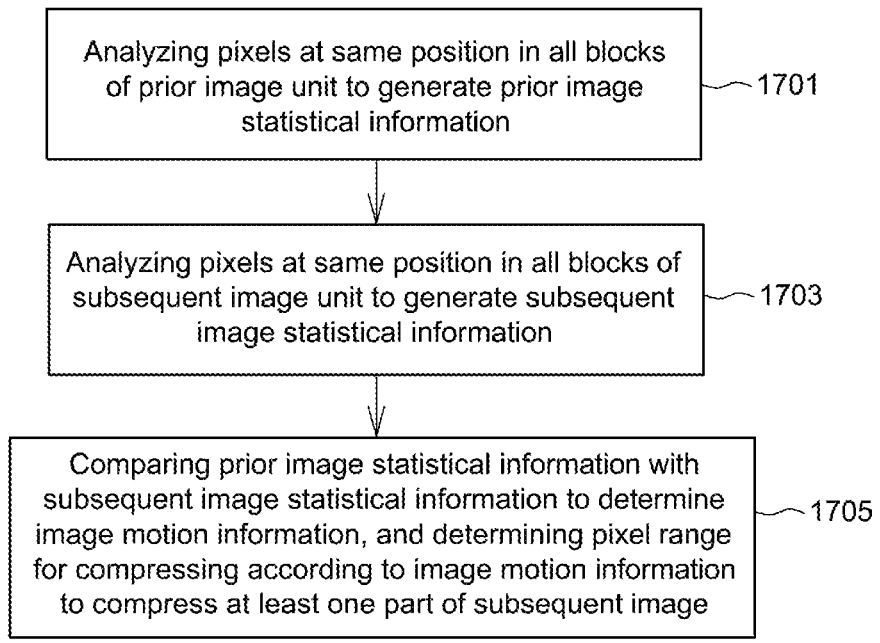
FIG. 17 is a flowchart of an image compression/decompression method according to an embodiment of the present invention.

FIG. 17 shows a flowchart of an image compression/decompression method according to an embodiment of the present invention. The image compression/decompression method comprises the following steps.

In step 1701, analyze pixels at the same position in all blocks of a prior image unit to generate a prior image statistical information, wherein the prior image unit consists of multiple blocks and each block comprises consists of multiple pixels.

In step 1703, analyze pixels at the same position in all blocks of a subsequent image unit to generate a subsequent image statistical information, wherein the subsequent image unit consists of multiple blocks and each block comprises consists of multiple pixels. And the block sizes in the prior image and the subsequent image are the same.

In step 1705, compare the prior image statistical information with the subsequent image statistical information to determine image motion information and determine a pixel range for compressing according to the image motion information to compress at least one part of the subsequent image, as in the embodiment in FIG. 9A.

Figure 18:
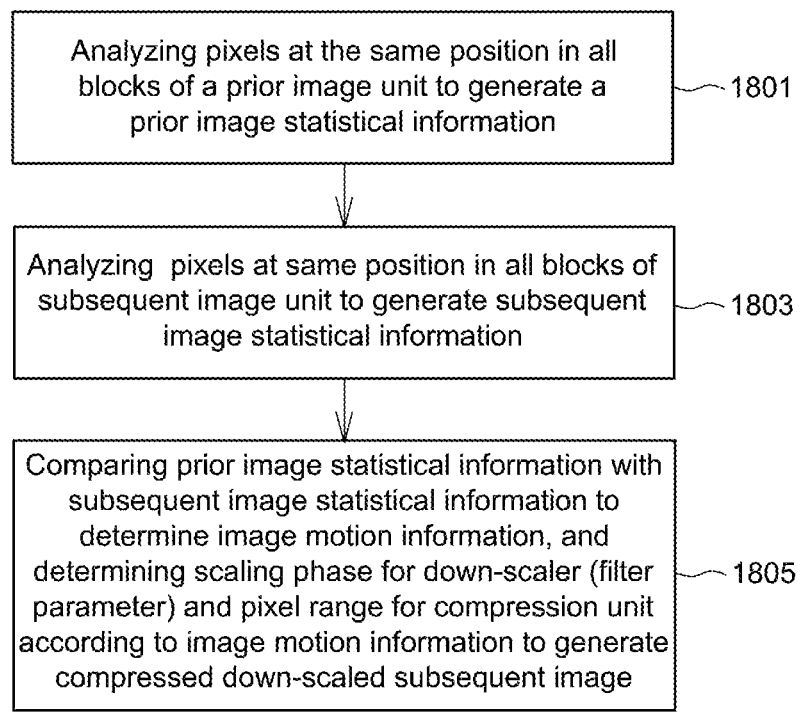
FIG. 18 is a flowchart of an image processing method according to another embodiment of the present invention.

FIG. 18 shows a flowchart of an image processing method according to another embodiment of the present invention. The image processing method comprises the following steps.

In step 1801, analyze pixels at the same position in all blocks of a prior image unit to generate a prior image statistical information, wherein the prior image unit consists of multiple blocks and each block comprises consists of multiple pixels.

In step 1803, analyze pixels at the same position in all blocks of a subsequent image unit to generate a subsequent image statistical information, wherein the subsequent image unit consists of multiple blocks and each block comprises consists of multiple pixels. And the block sizes in the prior image and the subsequent image are the same.

In step 1805, compare the prior image statistical information with the subsequent image statistical information to determine image motion information and determine a scaling phase for a down-scaler (a filter parameter) and a pixel range for a compression unit according to the image motion information to generate a compressed down-scaled subsequent image, as the embodiment in FIG. 13.

Thus, with the above embodiments, the image motion information can be detected by involving a smaller computation amount, and an image is processed according to the detected image motion information to improve the flickering issue in the prior art.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, for detecting an image motion information between a first image unit and a second image unit, wherein the first image unit and second image unit respectively comprises a plurality of blocks and each of the blocks comprises a plurality of pixels; the image motion detection method comprising:
   analyzing pixels at a same position in the blocks of the first image unit to generate a first image statistical information, comprising a first brightness distribution information or a first color distribution information;
   analyzing pixels at a same position in the blocks of the second image unit to generate a second image statistical information, comprising a second brightness distribution information or a second color distribution information; and
   comparing the first image statistical information with the second image statistical information to calculate the image motion information, wherein the image motion information indicates a motion of a first pixel from a first position in said first image unit to a second position in said second image unit;
   wherein, the first position and the second position have a same brightness distribution or a same color distribution.

2. The image processing method according to claim 1, wherein the first brightness distribution information and second brightness distribution comprise pixel counts corresponding to different brightness levels.

3. The image processing method according to claim 1, wherein the step of comparing the first image statistical information with the second image statistical information respectively renders the first image statistical information and the second image statistical information into graphs and compares the graphs.

4. The image processing method according to claim 1, wherein the first image unit is a prior image unit and the second image unit is a subsequent image unit.

5. The image processing method according to claim 1, further comprising: processing the second image unit according to the image motion information.

6. The image processing method according to claim 5, wherein the step of processing the second image according to the image motion information comprises:
   determining a pixel range according to the image motion information; and
   performing an image processing operation on the pixel range.

7. The image processing method according to claim 5, wherein the image processing operation is scaling-down.

8. The image processing method according to claim 5, wherein the image processing operation is pixel compressing.

9. An image processing apparatus, for detecting image motion information between a first image unit and a second image unit; the first image unit and second image unit respectively comprising a plurality of blocks, each of the blocks comprising a plurality of pixels; the image processing apparatus comprising:

an image motion detection module, for determining the image motion information, comprising:
- a calculation unit, for analyzing pixels at a same position in all blocks of the first image unit to generate a first image statistical information and analyzing pixels at a same position in all blocks of the second image unit to generate a second image statistical information; and
- a comparison unit, for comparing the first image statistical information with the second image statistical information to calculate the image motion information;
- wherein, the first image statistical information comprises a first brightness distribution information or a first color distribution information, the second image statistical information comprises a second brightness distribution information or a second color distribution, the image motion information indicates a motion of a first pixel from a first position in said first image unit to a second position in said second image unit, and the first position and the second position have a same brightness distribution or a same color distribution.

10. The image processing apparatus according to claim 9, wherein the first brightness distribution information and second brightness distribution comprise pixel counts corresponding to different brightness levels.

11. The image processing apparatus according to claim 9, wherein the comparison unit renders the first image statistical information and the second image statistical information into graphs and compares the graphs.

12. The image processing apparatus according to claim 9, wherein the first image unit is a prior image unit and the second image unit is a subsequent image unit.

13. The image processing apparatus according to claim 9, further comprising:
- an image processing module, for processing the second image according to the image motion information.

14. The image processing apparatus according to claim 13, wherein the image processing module is one of an image down-scaler and a compression unit.

15. The image processing apparatus according to claim 9, further comprising:
- an image processing module, for determining a pixel range according to the image motion information and performing an image processing operation on the pixel range.

16. The image processing apparatus according to claim 15, wherein the image processing operation is scaling-down.

17. The image processing apparatus according to claim 15, wherein the image processing operation is pixel compressing.

* * * * *